United States Patent
Hester, Jr.

[11] 3,892,763
[45] July 1, 1975

[54] 1-PROPYNYLAMINOMETHYL-6-PHENYL-4H-S-TRIAZOLO[4,3-A][1,4]BENZODIAZEPINES

[75] Inventor: Jackson B. Hester, Jr., Galesburg, Mich.

[73] Assignee: The Upjohn Company, Kalamazoo, Mich.

[22] Filed: Mar. 21, 1974

[21] Appl. No.: 453,194

[52] U.S. Cl............ 260/308 R; 71/92; 260/239.3 D; 424/269
[51] Int. Cl............................................ C07d 57/02
[58] Field of Search................................ 260/308 R

[56] References Cited
FOREIGN PATENTS OR APPLICATIONS
2,220,612  11/1972  Germany.................. 260/308 R Primary Examiner—Alton D. Rollins
Attorney, Agent, or Firm—Hans L. Berneis

[57] ABSTRACT

1,[[(2-propynyl)amino]methyl]-6-phenyl-4H-s-triazolo-[4,3-a][1,4]benzodiazepines of the formula 11:

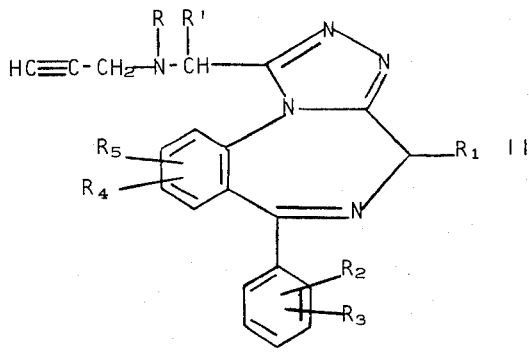

wherein R, R' and $R_1$ are hydrogen or alkyl of 1 to 3 carbon atoms, inclusive, and wherein $R_2$, $R_3$, $R_4$ and $R_5$ are hydrogen, alkyl as defined above, fluorine, chlorine, bromine, nitro or trifluoromethyl;

are prepared by reacting a 1-halomethyl-6-phenyl-4H-s-triazolo[4,3-a][1,4]benzodiazepine of the formula:

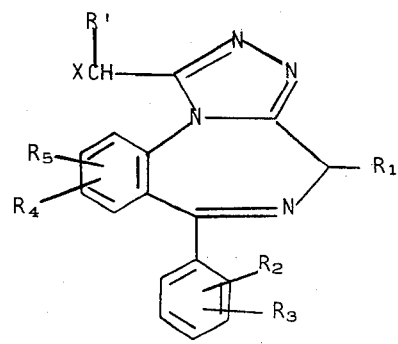

wherein R', $R_1$, $R_2$, $R_3$, $R_4$, and $R_5$ are defined as above, and X is chlorine or bromine, with a propargyl amine of the formula:

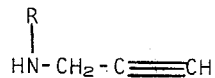

wherein R is defined as above.

The new compounds of formula 11 and their pharmacologically acceptable acid addition salts have both sedative-tranquilizing and antidepressant effects and can be used to treat anxieties and depression in mammals and birds.

14 Claims, No Drawings

1-PROPYNYLAMINOMETHYL-6-PHENYL-4H-S-TRIAZOLO[4,3-A][1,4]BENZODIAZEPINES

BACKGROUND OF THE INVENTION

1. Field of the Invention

This invention is directed to new organic compounds and is more specifically concerned with 1-[[(2-propynyl)amino]alkyl]-6-phenyl-4H-s-triazolo[4,3-a][1,4]-benzodiazepines of formula 11 and a process of production therefor.

The novel compounds of formula 11 and the process of production therefor can be illustratively represented as follows:

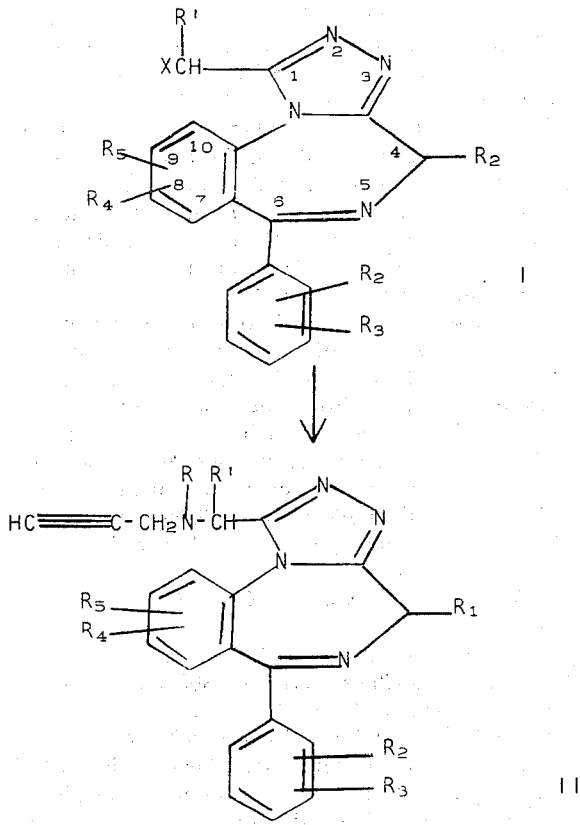

wherein R, R' and R$_1$ are hydrogen or alkyl of 1 to 3 carbon atoms, inclusive; wherein R$_2$, R$_3$, R$_4$ and R$_5$ are hydrogen, alkyl as defined above, fluorine, chlorine bromine, nitro or trifluoromethyl, and wherein X is chlorine or bromine.

The invention also embraces the pharmacologically acceptable acid addition salts of compounds of formula 11.

The more desired compounds of this invention are of the formula 11A.

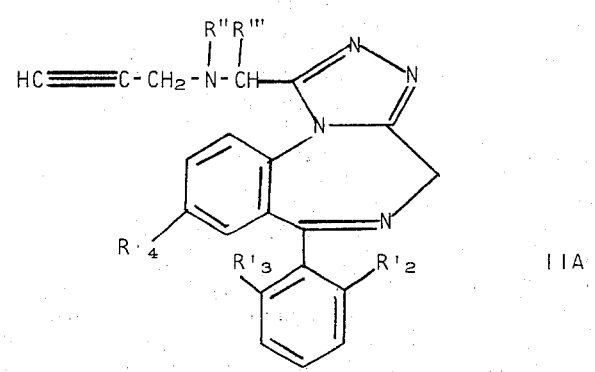

wherein R'' and R''' are hydrogen or methyl, wherein R'$_2$ is hydrogen, chlorine or fluorine, wherein R'$_3$ is hydrogen, or fluorine, providing R'$_2$ is fluorine, and wherein R'$_4$ is chlorine, fluorine, bromine, trifluoromethyl and nitro, and the pharmacologically acceptable acid addition salts thereof.

The most desirable compounds have the formula 11B below:

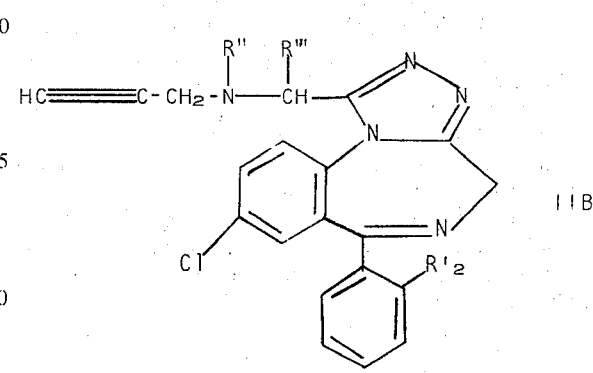

wherein R'' and R''' are hydrogen or methyl; and wherein R'$_2$ is hydrogen, chlorine or fluorine and the pharmacologically acceptable acid addition salts thereof.

The process of this invention comprises: treating a compound of formula 1 with a propargyl amine of the formula:

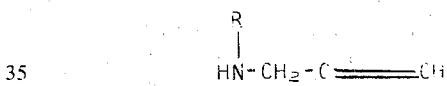

wherein R is defined as hereinbefore, in an inert organic solvent and in the presence of potassium iodide to give a compound of formula 11 above.

DESCRIPTION OF THE PREFERRED EMBODIMENT

Alkyl groups of 1 to 3 carbon atoms, inclusive, are exemplified by methyl, ethyl, propyl, and isopropyl.

The novel compounds of formula 11 (including formula 11A and 11B) and the acid addition salts thereof have sedative, tranquilizing and antidepresant effects in mammals and birds.

The acid addition salts of compounds of formula 11 contemplated in this invention are the hydrochlorides, hydrobromides, hydriodides, sulfates, phosphates, cyclohexanesulfamates, methanesulfonates, and the like, prepared by reacting a compound of the formula 11 with the stoichiometrically calculated amount of the selected pharmacologically acceptable acid.

Sedative effects of these compounds of formula 11 (including compound 11A and 11B) are shown by the following tests in mice:

Chimney test: [Med. Exp 4, 145 (1961)]:
  The test determines the ability of mice to back up and out of a vertical glass cylinder within 30 seconds. At the effective dosage, 50% of the mice failed doing it.

Dish Test: Mice in Petri dishes (10 cm. diameter, 5 cm high, partially embedded in wood shavings), climb out in a very short time, when not treated. Mice remaining in the dish for more than 3 minutes indicates tranquilization. $ED_{50}$ equals the dose of test compound at which 50% of the mice remain in the dish.

Pedestal test: The untreated mouse leaves the pedestal in less than an minute to climb back to the floor of the standard mouse box. Tranquilized mice will stay on the pedestal for more than 1 minute.

Nicotine antagonism test: Mice in a group of 6 are injected with the test compound. Thirty minutes later the mice [including control (untreated) mice] are injected with nicotine salicylate (2 mg./kg.). The control mice show overstimulation, i.e., (1) running convulsions followed by (2) tonic extensor fits; followed by (3) death.

The antidepressant effects are tested by the standard test in the art: The antagonism to body temperature lowering by oxotremorine, and the synergistic increase of the lethality of a standard dose of yohimbine in mice, as well as the synergistic apomorphine gnawing test. The compounds were found to be active in these tests.

The pharmaceutical forms contemplated by this invention include pharmaceutical compositions suited for oral, parenteral, and rectal use, e.g., tablets, powder packets, cachets, dragees, capsules, solutions, suspensions, sterile injectable forms, suppositories, bougies, and the like. Suitable diluents or carriers such as carbohydrates (lactose), proteins, lipids, calcium phosphate, cornstarch, stearic acid, methylcellulose and the like may be used as carriers or for coating purposes. Water and oil, e.g., coconut oil, sesame oil, safflower oil, cottonseed oil, or peanut oil, may be used for preparing solutions or suspensions of the active drug. Sweetening, coloring, and flavoring agents may be added.

For mammals and birds food premixes with starch, oatmeal, dried fishmeat, fishmeal, flour, and the like can be prepared.

As tranquilizer-antidepressant the compounds of formula 11 and salts thereof can be used in unit dosages of 0.02 mg./kg. to 5.0 mg./kg., preferably from 0.1–2 mg./kg., in oral or injectable preparations as described above, to alleviate tension and anxiety in mammals, or birds, such as e.g., occurs when animals are in travel. For larger mammals (5 kg. or over) the lower dosages ranges are preferred.

Other acid addition salts of the compounds of formula 11 can be made such as the fluosilicic acid addition salts which are useful mothproofing compounds or the trichloroacetates useful as herbicides against Johnson grass, Bermuda grass, yellow foxtail and green foxtail, and quack grass.

The starting materials of formula 1 of this invention, are prepared as shown in the Preparations.

In carrying out the process of this invention, a compound of Formula 1 is reacted with an excess of a selected propargyl amine of the formula:

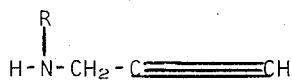

in which R is defined as above in an inert organic solvent. The solvents for this reaction comprise: dimethylformamide, dimethylacetamide, tetrahydrofuran, dioxane, methanol, ethanol, propanol, and the like. The temperature for this reaction is 10° to 50° C., with room temperatures 20° to 30° C. preferred. The reaction period is between 6 to 24 hours. In the preferred embodiment of this reaction, an alkali metal iodide, potassium or sodium iodide, is used to catalyze the reaction. After the reaction is terminated, the product is obtained by conventional means, such as extraction, evaporation of the extract, and crystallizing the solids. Further conventional means can be used to purify the product, e.g., recrystallization and chromatography.

The following Preparations and Examples are illustrative of the products and the process of the present invention, but are not to be construed as limiting.

Preparation 1 7-Chloro-5-phenyl-3H-1,4-benzodiazepin-2-yl hydrazine

A stirred mixture of 7-chloro-1,3-dihydro-5-phenyl-2H-1,4-benzodiazepine-2-thione (5- g., 0.174 mole) G. A. Archer, J. Org. Chem. 29 231 (1964) and methanol (1700 ml.) was treated with hydrazine hydrate (34.9 g.) and allowed to remain at ambient temperature for 1 hour 45 minutes. A slow stream of nitrogen was bubbled through the mixture during this period. The resulting solution was concentrated in vacuo at 25°–30°C. The thus obtained residue was mixed with water and extracted with chloroform. The extract was dried over anhydrous potassium carbonate and concentrated under reduced pressure on the rotary evaporator in such a manner that the chloroform was replaced by ethyl acetate. The resulting mixture was crystallized at 4°C. to give 26.6 g. of 7-chloro-5-phenyl-3H-1,4-benzodiazepin-2-yl hydrazine of melting point 184°–186°C. and 3.04 g. of melting point 204°–211° C. (60%). This compound decomposes on heating in solvents to an unknown product, melting point 261°–262° C. The analytical sample was crystallized from ethyl acetate and had a melting point 217.5°–219°C.

Anal. calcd. for $C_{15}H_{13}ClN_4$:
C, 63.27; H, 4.60; Cl, 12.45; N 19.68.
Found:
C, 63.30; H, 4.52; Cl, 12.46; N, 18.86.

Preparation 2 8-Chloro-1-(chloromethyl)-6-penyl-4H-s-triazolo[4,3-a][1,4]benzodiazepine 7-Chloro-5-phenyl-3H-1,4-benzodiazepin-2-yl hydrazine [14.2 g., 0.05 mole) was added slowly to acetic acid (150 ml.) with external cooling. A solution of chloroacetyl chloride (5.65 g.) in acetic acid (75 ml.) was then added during 10 minutes, and the red solution was stirred at ambient temperature for 1.5 hours, treated with sodium acetate (4.1 g.) stirred again for 30 minutes and then refluxed for 3 hours and 15 minutes. This mixture was cooled, poured into ice water and concentrated to a small volume. It was then diluted with water, neutralized with sodium bicarbonate and extracted with chloroform. The extract was dried over anhydrous magnesium sulfate, concentrated and the residue chromatographed on silica gel (1 kg.) with 1% methanol-99% chloroform. The product obtained from the column was crystallized from ethyl acetate to give 6.36 g. of 8-chloro-1-(chloromethyl)-6-phenyl-4H-s-triazolo[4,3-a][1,4]benzodiazepine. The analytical sample had a melting point 183°–186.5° C.

Anal. calcd. for $C_{17}H_{12}Cl_2N_4$:
C, 59.49; H, 3.53; Cl, 20.66; N,, 16.33
Found:
C, 59.59; H, 3.31; Cl, 20.21; N, 16.42.

Preparation 3 8-Chloro-1-(bromomethyl)-6-phenyl-4H-s-triazolo[4,3-a][1,4]benzodiazepine In the manner given in Preparation 2, 7-chloro-5-phenyl-3H-1,4-benzodiazepin-2-yl hydrazine was reacted with bromoacetyl chloride and after 1.5 hours with sodium acetate, then refluxed to give 8-chloro-1-bromomethyl-6-phenyl-4H-triazole[4,3-a][1,4]benzodiazepine.

Preparation 4  8-chloro-1-(α-chloroethyl)-6-phenyl-4H-s-triazolo[4,3-a[1,4]benzodiazepine 7-chloro-5-phenyl-3H-1,4-benzodiazepin-2-yl hydrazine (2.85 g., 0.01 mole) was added, under nitrogen, with cooling and stirring to glacial acetic acid (30 ml.). A solution of 2-chloropropionyl chloride in acetic acid (15 ml.) was then added dropwise, and the resulting red solution was stirred at room temperature for 1.5 hours, treated with sodium acetate (0.82 g., 0.01 mole), stirred for an additional 30 minutes and then refluxed for 2 hours. This mixture was cooled, poured into ice water and concentrated to a small volume. The residual solution was neutralized with sodium bicarbonate and extracted with methylene chloride. The extract was dried over anhydrous magnesium sulfate and concentrated. The residue was chromatographed on silica gel (400 g.) with 1% methanol 99% chloroform. The product thus obtained was crystallized from a small amount of ethyl acetate to give 1.39 g. of 8-chloro-1-(α-chloroethyl)-6-phenyl-4H-s-triazolo-[4,3-a][1,4]benzodiazepine of melting point 153.5°–156.5° C.

Anal. calcd. for $C_{18}H_{14}Cl_2N_4$:

C, 60.52; H, 3.95; Cl, 19.85; N, 15.68.

Found:

C, 60.34; H, 4.07; Cl, 19.81; N, 15.65.

Preparation 5  8-Fluoro-1-(α-bromoethyl)-6-(o-chlorophenyl)-4H-s-triazolo[4,3-a][1,4]benzodiazepine In the manner given in Preparation 4, 7-fluoro-5-(o-chlorophenyl)-3H-1,4-benzodiazepin-2-yl hydrazine was reacted with 2-bromopropionyl chloride, and after 1.5 hours with sodium acetate the mixture was then refluxed to give 8-fluoro-1-(α-bromoethyl)-6-(o-chlorophenyl)-4H-s-triazolo[4,3-a][1,4]benzodiazepine.

Preparation 6  8-Trifluoromethyl-1-(α-chloroethyl)-6-(o-chlorophenyl)-4H-s-triazolo[4,3-a][1,4]benzodizaepine.

In the manner given in Preparation 4, 7-trifluoromethyl-5-(o-chlorophenyl)-3H-1,4-benzodiazepin-2-yl hydrazine was reacted with α-chloropropionyl chloride and after 1.5 hours with sodium acetate, then refluxed to give 8-trifluoromethyl-1-(α-chloroethyl)-6-(o-chlorophenyl)-4H-s-triazolo-[4,3-a][1,4]benzodiazepine.

Preparation 7  8-chloro-1-(chloromethyl)-6-(o-chlorophenyl)-4H-s-triazolo[4,3-a][1,4]benzodiazepine.

In the manner given in Preparation 2, 7-chloro-5-(o-chlorophenyl)-3H-1,4-benzodiazepin-2-yl hydrazine was reacted with chloroacetyl bromide and after 1.5 hours with sodium acetate. The mixture was then refluxed to give 8-chloro-1-(chloromethyl)-6-(o-chlorophenyl)-4H-s-triazolo[4,3-a][1,4]benzodiazepine.

Preparation 8  8-Fluoro-1-(chloromethyl)-6-(o-fluorophenyl)-4H-s-triazolo[4,3-a][1,4]benzodiazepine.

In the manner given in Preparation 2, 7-fluoro-5-(o-fluorophenyl)-3H-1,4-benzodiazepin-2-yl hydrazine was reacted wtih chloroacetyl chloride and after 1.5 hours with sodium acetate. The mixture was then refluxed to give 8-fluoro-1-(chloromethyl)-6-(o-fluorophenyl)-4H-s-triazolo[4,3-a][1,4]benzodiazepine.

Preparation 9  8-Chloro-1-(chloromethyl)-6-(2,6-difluorophenyl)-4H-s-triazolo[4,3-a][1,4]benzodiazepine.

In the manner given in Preparation 2, 7-chloro-5-(2,6-difluorophenyl)-3H-1,4-benzodiazepin-2-yl hydrazine was reacted with chloroacetyl chloride and after 1.5 hours with sodium acetate, then the mixture was refluxed to give 8-chloro-1-(chloromethyl)-6-(2,6-difluorophenyl)-4H-s-triazolo[4,3-a][1,4]benzodiazepine.

Preparation 10  8-Nitro-1-(bromomethyl)-6-(o-chlorophenyl)-4H-s-triazolo[4,3-a][1,4]benzodiazepine.

In the manner given in Preparation 2, 7-nitro-5-(o-chlorophenyl)-3H-1,4-benzodiazepin-2-yl hydrazine was reacted with bromoacetyl bromide and after 1.5 hours with sodium acetate, then refluxed to give 8-nitro-1-(bromomethyl)-6-(o-chlorophenyl)-4H-s-triazolo[4,3-a][1,4]-benzodiazepine.

Preparation 11  1-chloromethyl-7-trifluoromethyl-6-(o-fluorophenyl)-4H-s-triazolo[4,3-a][1,4]benzodiazepine.

In the manner given in Preparation 2, 6-trifluoromethyl-5-(o-fluorophenyl)-3H-1,4-benzodiazepin-2-yl hydrazine was reacted with chloroacetyl chloride and after 1.5 hours with sodium acetate, then refluxed to give 1-(chloromethyl)-7-trifluoromethyl-6-(o-fluorophenyl)-4H-s-triazolo[4,3-a][1,4]benzodiazepine.

In the manner given in the prior preparations other starting compounds of formula 1 can be prepared. Representative compounds of formula 1, thus prepared, comprise:

1-(chloromethyl)-8-bromo-6-phenyl-4H-s-triazolo[4,3-a]-[1,4]benzodiazepine, 1-(α-chloropropyl)-8-chloro-6-phenyl-4H-s-triazolo[4,3-a]-[1,4]benzodiazepine, 1-(α-chloroethyl)-8-fluoro-6-(o-chlorophenyl)-4H-s-triazolo[4,3-a][1,4]benzodiazepine, 1-(chloromethyl)-10-fluoro-6-(o-fluorophenyl)-4H-s-triazolo[4,3-a][1,4]benzodiazepine, 1-(chloromethyl)-7-nitro-6-(m-chlorophenyl)-4H-s-triazolo-[4,3-a][1,4]benzodiazepine, 1-(chloromethyl)-9-nitro-6-(p-nitrophenyl)-4H-s-triazolo-[4,3-a][1,4]benzodiazepine, 1-(chloromethyl)-7-bromo-6-(o-methylphenyl)-4H-s-triazolo-[4,3-a][1,4]benzodiazepine, 1-(α-chloroethyl)-10-methyl-6-(o-propylphenyl)-4H-s-triazolo[4,3-a][1,4]benzodiazepine, 1-(α-chloropropyl)-9-isopropyl-6-(m-isopropylphenyl)-4H-s-triazolo[4,3-a][1,4]benzodiazepine, 1-(chloromethyl)-8-nitro-6-(2,6-difluorophenyl)-4H-s-triazolo[4,3-a][1,4]benzodiazepine, 1-(α-chloroethyl)-8-nitro-6-(2,6-difluorophenyl)-4H-s-triazolo[4,3-a][1,4]benzodiazepine, 1-(chloromethyl)-8-trifluoromethyl-6-(o-fluorophenyl)-4H-s-triazolo[4,3-a][1,4]benzodiazepine, 1-(α-bromoethyl)-8-nitro-6-(o-chlorophenyl)-4H-s-triazolo[4,3-a][1,4]benzodiazepine, and the like.

EXAMPLE 1

8-Chloro-1-[[2-(propynyl)amino]methyl]-6-phenyl-4H-s-trizolo[4,3-a][1,4]benzodiazepine. A stirred mixture of 1-(chloromethyl)-8-chloro-6-phenyl-4H-s-triazolo[4,3-a][1,4]benzodiazepine (3.43 g, 0.01 mole), potassium iodide (1.66 g, 0.01 mole), propargyl amine (1.10 g, 0.02 mole) and dimethyl formamide (50 ml) was kept at ambient temperature, under nitrogen, for 12 hours, and concentrated in vacuo. The residue was mixed with water and extracted wtih methylene chloride. The extract was washed with water, dried over anhydrous sodium sulfate, and concentrated. Crystallization of the residue from methanol ethyl acetate gave a small amount of a solid of melting point 155°–158° C. dec. The mother liquor was concentrated and chromatographed on silica gel (300 g) with a mixture of 2.5% methanol-97.5% chloroform. The product thus obtained was crystallized from methylene chloride to give 1.62 g. of 8-Chloro-1-[[(2-propynyl)amino]methyl]-6-phenyl- 4H-s-triazolo[4,3-a][1,4]benzodiazepine of melting point 193°–195.5° C. and 0.38 g, of melting point 190°–194° C. The analytical sample had melting point 193°–195.5° C.
Anal. Calcd. for $C_{20}H_{16}ClN_5$:
C, 66.39; H, 4.46; Cl, 9.80; N, 19.36
Found:
C, 66.27; H, 4.54; Cl, 10.05; N, 19.66.

EXAMPLE 2

8-Chloro-1-[1-[(2-propynyl)amino]ethyl]-6-phenyl-4H-s-triazolo[4,3-a][1,4]benzodiazepine.

A stirred mixture of 1-(α-chloroethyl)-8-chloro-6-phenyl-4H-s-triazolo[4,3-a][1,4]benzodiazepine (3.57 g, 0.01 mole), propargylamine (1.10 g, 0.02 mole), potassium iodide (1.66 g, 0.01 mole) and dimethylformamide (50 ml) was kept at ambient temperature (25° C) for 24 hours and concentrated in vacuo. The residue was mixed with water and extracted with methylene chloride. The extract was washed with water, dried over anhydrous sodium sulfate and concentrated. The residue was chromatographed on silica gel (300 g) with 2.5% methanol-97.5% chloroform. The resulting product was crystallized from ethylacetate-Skellysolve B hexanes to give 1.25 g. of 8-chloro-1-[1-[(2-propynyl)amino]ethyl]-6-phenyl-4H-s-triazolo[4,3-a]-[1,4]benzodiazepine of melting point 147°–151° C., 0.45 g, of melting point 142°–146° C. and 0.13 g of melting point 131°–139° C. The analytical sample had melting point 146°–152°.
Anal. calcd. for $C_{21}H_{18}ClN_5$:
C, 67.10; H, 4.83; Cl, 9.43; N, 18.63
Found:
C, 67.15; H, 4.86; Cl, 9.47; N, 18.97.

EXAMPLE 3

8-Chloro-1-[[methyl(2-propynyl)amino]methyl]-6-phenyl-4H-s-triazolo[4,3-a][1,4]benzodiazepine hydrochloride.

A stirred mixture of 8-chloro-1-(chloromethyl)-6-phenyl-4H-s-triazolo[4,3-a][1,4]benzodiazepine (1.72 g, 0.005 mole), potassium iodide (1.66 g, 0.01 mole) N-methylproparglyamine (1.04 g, 0.015 mole) and dimethyl formamide (25 ml) was kept under nitrogen at ambient temperature (25°) for 18 hours, diluted with water, and extracted with methylene chloride. The extract was dried over anhydrous sodium sulfate and concentrated in vacuo. A solution of the residue was acidified with methanolic hydrochloric acid, and the salt was recrystallized from methanol-ethylacetate to give 8-chloro-1-[[methyl(2-propynyl)amino]methyl]-6-phenyl-4H-s-triazolo[4,3-a][1,4]-benzodiazepine hydrochloride (1.34 g) of melting point 228°–230° C (dec.) and 0.07 g, of melting point 230°–232° C (dec.) The analytical sample had melting point 231°–232° dec.
Anal. Calcd. for $C_{12}H_{19}Cl_2N_5$:
C, 61.17; H, 4.64; Cl, 17.20; N, 16.99
Found:
C, 60.72; H, 4.72; Cl, 17.08; N, 16.87

EXAMPLE 4:

8-chloro-1[[(2-propynyl)amino]methyl]-6-(o-chlorophenyl)-4H-s-triazolo[4,3-a][1,4]benzodiazepine In the manner given in Example 1, 8-chloro-1-(chloromethyl)-6-(o-chlorophenyl)-4H-s-triazolo[4,3-a][1,4]-benzodiazepine in dimethylformamide was reacted at room temperature with propargylamine in the presence of potassium iodide to give 8-chloro-1-[[(2-propynyl)amino]-methyl]-6-(o-chlorophenyl)-4H-s-triazolo[4,3-a][1,4]-benzodiazepine.

EXAMPLE 5

8-chloro-1-[1-[(2-propynyl)amino]propyl]-6-phenyl-4H-s-triazolo[4,3-a][1,4]benzodiazepine In the manner given in Example 1, 8-chloro-1-(α-bromopropyl)-6-phenyl-4H-s-triazolo[4,3-a][1,4]benzodiazepine in dimethylformamide was reacted at room temperature with propargylamine in the presence of potassium iodide to give 8-chloro-1-[1-[(2-propynyl)-amino]propyl]-6-phenyl-4H-s-triazolo[4,3-a][1,4]benzodiazepine

EXAMPLE 6

8-fluoro-1-[[methyl(2-propynyl)amino[methyl]-6-(o-chlorophenyl)-4H-s-triazolo[4,3-a][1,4]benzodiazepine.

In the manner given in Example 1, 8-fluoro-1-(bromomethyl)-6-(o-chlorophenyl)-4H-s-triazolo[4,3-a][1,4]benzodiazepine in dimethylformamide was reacted at room temperature with N-methylpropargylamine in the presence of potassium iodide to give 8-fluoro-1-[[methyl(2-propynyl)-amino]methyl]-6-(o-chlorophenyl)-4H-trizolo[4,3-a][1,4]-benzodiazepine

EXAMPLE 7

8-trifluoromethyl-1-[[methyl(2-propynyl)amino]-methyl]-6-(o-chlorophenyl)-4H-s-triazolo[4,3-a][1,4]-benzodiazepine In the manner given in Example 1, 8-trifluoromethyl-1-(α-chloromethyl)-6-(o-chlorophenyl)-4H-s-trizolo[4,3-a]-[1,4]benzodiazepine in dimethylformamide was reacted at room temperature with N-methylpropargylamine in the presence of potassium iodide to give 8-trifluoromethyl-1-[[methyl(2-propynyl)amino]methyl]-6-(o-chlorophenyl)-4H-s-triazolo-[4,3-a][1,4]benzodiazepine

EXAMPLE 8

8-chloro-1-[1-[(2-propynyl)amino]ethyl]-6-(o-chlorophenyl)-4H-s-triazolo[4,3-a][1,4]benzodiazepine In the manner given in Example 1, 8-chloro-1-(α-chloroethyl)-6-(o-chlorophenyl)-4H-s-triazolo[4,3-a][1,4]-benzodiazepine in dimethylformamide was reacted at room temperature with propargylamine in the presence of potassium iodide to give 8-chloro-1-[1-[(2-propynyl)amino]-ethyl]-6-(o-chlorophenyl)-4H-s-triazolo[4,3-a][1,4]benzodiazepine.

EXAMPLE 9

8-chloro-1-[1-[methyl(2-propynyl)amino]ethyl]-6-(o-chlorophenyl)-4H-s-triazolo[4,3-a][1,4]benzodiazepine In the manner given in Example 1, 8-chloro-1-(α-chloroethyl)-6-(o-chlorophenyl)-4H-s-triazolo[4,3-a][1,4]-benzodiazepine in dimethylformamide was reacted at room temperature with N-methylpropargylamine in the presence of potassium iodide to give 8-chloro-1-[1-[methyl(2-propynyl)amino]ethyl]-6-(o-chlorophenyl)-4H-s-triazolo-[4,3-a][1,4]benzodiazepine

EXAMPLE 10

8-chloro-1-[[(2-propynyl)amino]methyl]-6-(2,6-difluorophenyl)-4H-s-triazolo[4,3-a][1,4]benzodiazepine In the manner given in Example 1, 8-chloro-1-(chloromethyl)-6-(2,6-difluorophenyl)-4H-s-triazolo[4,3-a][1,4-benzodiazepine in dimethylformamide was reacted at room temperature with propargylamine in the presence of potassium iodide to give 8-chloro-1-[[2-propynyl]amino]methyl]-6-(2,6-difluorophenyl)-4H-s-triazolo[4,3-a][1,4]benzodiazepine

EXAMPLE 11

8-nitro-1-[[(2-propynyl)amino]methyl]-6-(o-chlorophenyl)-4H-s-triazolo[4,3-a][1,4]benzodiazepine In the manner given in Example 1, 8-nitro-1-(bromomethyl)-6-(o-chlorophenyl)-4H-s-triazolo[4,3-a][1,4]benzodiazepine in dimethylformamide was reacted at room temperature with propargylamine in the presence of potassium iodide to give 8-nitro-1-[[(2-propynyl)amino]-methyl]-6-(o-chlorophenyl)-4H-s-triazolo[4,3-a][1,4]benzodiazepine

EXAMPLE 12

8-Nitro-1-[1-[(2-propynyl)amino]ethyl]-6-(o-chlorophenyl)-4H-s-triazolo[4,3-a][1,4]benzodiazepine.

In the manner given in Example 1, 8-nitro-1-(α-bromoethyl)-6-(o-chlorophenyl)-4H-s-triazolo[4,3-a]-[1,4]benzodiazepine in dimethylformamide was reacted at room temperature with propargylamine in the presence of potassium iodide to give 8-nitro-1-[(2-propynyl)amino]-ethyl]-6-(o-chlorophenyl)-4H-s-triazolo[4,3-a][1,4]benzodiazepine.

EXAMPLE 13

8-Nitro-1-[[methyl(2-propynyl)amino]methyl]-6-(o-chlorophenyl)-4H-s-triazolo[4,3-a][1,4]benzodiazepine.

In the manner given in Example 3, 8-nitro-1-(bromomethyl)-6-(o-chlorophenyl)-4H-s-triazolo[4,3-a][1,4]benzodiazepine in dimethylformamide was reacted at room temperature with N-methylpropargylamine in the presence of potassium iodide to give 8-nitro-1-[[methyl(2-propynyl)-amino]methyl]-6-(o-chlorophenyl)-4H-s-triazolo[4,3-a][1,4]benzodiazepine.

EXAMPLE 14

7-trifluoromethyl-9-nitro-1-[[(2-propynyl)amino]-methyl]-6-(o-nitrophenyl)-4H-s-triazolo[4,3-a][1,4]benzodiazepine.

In the manner given in Example 1, 7-trifluoromethyl-9-nitro-1-(chloromethyl)-6-(o-nitrophenyl)-4H-s-triazolo-[4,3-a][1,4]benzodiazepine in dimethylformamide was reacted at room temperature with propargylamine in the presence of potassium iodide to give 7-trifluoromethyl-9-nitro-1-[[(2-propynyl)amino]methyl]-6-(o-nitrophenyl)-4H-s-triazolo[4,3-a][1,4]benzodiazepine.

EXAMPLE 15

8-chloro-1-[1-[(2-propynyl)amino]propyl]-6-(o-chlorophenyl)-4H-s-triazolo[4,3-a][1,4]benzodiazepine.

In the manner given in Example 1, 8-chloro-1-(α-chloropropyl)-6-(o-chlorophenyl)-4H-s-triazolo[4,3-a][1,4]benzodiazepine in dimethylformamide was reacted at room temperature with propargylamine in the presence of potassium iodide to give 8-chloro-1-[1-[(2-propynyl)amino]propyl]-6-(o-chlorophenyl)-4H-s-triazolo[4,3-a][1,4]benzodiazepine.

EXAMPLE 16

8-fluoro-1-[1-[(2-propynyl)amino]ethyl]-6-(o-chlorophenyl)-4H-s-triazolo[4,3-a][1,4]benzodiazepine.

In the manner given in Example 2, 8-fluoro-1-(α-chloroethyl)-6-(o-chlorophenyl)-4H-s-triazolo[4,3-a][1,4]-benzodiazepine in dimethylformamide was reacted at room temperature with propargylamine in the presence of potassium iodide to give 8-fluoro-1-[1-[(2-propynyl)amino]-ethyl]-6-(o-chlorophenyl)-4H-s-triazolo[4,3-a][1,4]benzodiazepine.

EXAMPLE 17

8-chloro-1-[[methyl(2-propynyl)amino]methyl]-6-(o-chlorophenyl)-4H-s-triazolo[4,3-a][1,4]benzodiazepine.

In the manner given in Example 3, 8-chloro-1-chloromethyl-6-(o-chlorophenyl)-4H-s-triazolo[4,3-a][1,4]benzodiazepine in dimethylformamide was reacted at room temperature with N-methylpropargylamine in the presence of potassium iodide to give 8-chloro-1-[[methyl(2-propynyl)amino]methyl]-6-(o-chlorophenyl)-4H-s-triazolo[4,3-a][1,4]benzodiazepine.

EXAMPLE 18

8-nitro-1-[[methyl(2-propynyl)amino]methyl]-6-phenyl-4H-s-triazolo[4,3-a][1,4]benzodiazepine.

In the manner given in Example 3, 8-nitro-1-chloromethyl-6-phenyl-4H-s-triazolo[4,3-a][1,4]benzodiazepine in dimethylformamide was reacted at room temperature with N-methyl propargylamine in the presence of potassium iodide to give 8-nitro-1-[[methyl(2-propynyl)amino]methyl]-6-phenyl-4H-s-triazolo[4,3-a][1,4]benzodiazepine.

EXAMPLE 19

8-trifluoromethyl-1-[[methyl(2-propynyl)-amino]methyl]-6-phenyl-4H-s-triazolo[4,3-a][1,4]benzodiazepine.

In the manner given in Example 3, 8-trifluoromethyl-1-chloromethyl-6-phenyl-4H-s-triazolo[4,3-a][1,4]benzodiazepine in dimethylformamide was reacted at room temperature with N-methylpropargylamine in the presence of potassium iodide to give 8-trifluoromethyl-1-[[methyl(2-propynyl)amino]methyl]-6-phenyl-4H-s-triazolo[4,3-a][1,4]benzodiazepine.

EXAMPLE 20

8-fluoro-1-[[methyl(2-propynyl)amino]methyl]-6-phenyl-4H-s-triazolo[4,3-a][1,4]benzodiazepine.

In the manner given in Example 3, 8-fluoro-1-chloromethyl-6-phenyl-4H-s-triazolo[4,3-a][1,4]benzodiazepine in dimethylformamide was reacted at room temperature with N-methylpropargylamine in the presence of potassium iodide to give 8-fluoro-1-[[methyl(2-propynyl)amino]methyl]-6-pheynl-4H-s-triazolo[4,3-a][1,4]benzodiazepine.

In the manner given in the preceding examples other 1-alkynylaminoalkyl-6-phenyl-4H-s-triazolo[4,3-a][1,4]-benzodiazepines of formula II can be produced. Representative compounds, thus produced, comprise:

8-bromo-1-[[-(2-propynyl)amino]methyl]-6-phenyl-4H-s-triazolo[4,3-a][1,4]benzodiazepine.
10-fluoro-1-[[(2-propynyl)amino]methyl]-6-(o-fluorophenyl)-4H-s-triazolo[4,3-a][1,4]benzodiazepine.
7-nitro-1-[[(2-propynyl)amino]methyl]-6-(m-chlorophenyl)-4H-s-triazolo[4,3-a][1,4]benzodiazepine.
9-Nitro-1-[[(2-propynyl)amino]methyl]-6-(p-nitrophenyl)-4H-s-triazolo[4,3-a][1,4]benzodiazepine.
7-bromo-1-[[(2-propynyl)amino]methyl]-6-(o-bromophenyl)-4H-s-triazolo[4,3-a][1,4]benzodiazepine. 4-methyl-1-[1-[(2-propynyl)amino]ethyl]-6-(o-fluorophenyl)-4H-s-triazolo[4,3-a][1,4]benzodiazepine. 9-isopropyl-1-[1-[1-[(2-propynyl)amino]propyl]-6-(m-isopropylphenyl)-4H-s-triazolo[4,3-a][1,4]benzodiazepine. 8-nitro-1-[[(2-propynyl)amino]methyl]-6-(2,6-difluorophenyl)-4H-s-triazolo[4,3-a][1,4]benzodiazepine. 8-trifluoromethyl-1-[[(2-propynylamino)methyl]-6-(o-fluorophenyl)-4H-s-triazolo[4,3-a][1,4]benzodiazepine. 8-bromo-1-[[methyl(2-propynyl)amino]methyl]-6-phenyl-4H-s-triazolo[4,3-a][1,4]benzodiazepine. 8-bromo-1-[[ethyl(2-propynyl)amino]methyl]-6-phenyl-4H-s-triazolo[4,3-a][1,4]benzodiazepine. 8-fluoro-1-[[methyl(2-propynyl)amino]methyl]-6-(o-fluorophenyl)-4H-s-triazolo[4,3-a][1,4]benzodiazepine. 7-nitro-1-[[methyl(2-propynyl)amino]methyl] -6-(m-chlorophenyl)-4H-s-triazolo[4,3-a][1,4]benzodiazepine. 9-nitro-1-[[ethyl(2-propynyl)amino]methyl]-6-(p-nitrophenyl)-4H-s-triazolo[4,3-a][1,4]benzodiazepine, 7-bromo-1-[[methyl(2-propynyl)amino]methyl]-6-(o-fluorophenyl)-4H-s-triazolo[4,3-a][1,4]benzodiazepine, 10-methyl-1-[methyl(2-propynyl)amino]methyl]-6-(o-bromophenyl)-4H-s-triazolo[4,3-a][1,4]benzodiazepine. 1-[1-[ethyl(2-propynyl)amino]propyl]-6-(o-chloropheny)-4H-s-triazolo[4,3-a][1,4]benzodiazepine. 8-nitro-1-[[methyl(2-propynyl)amino]methyl]-6-(2,6-difluorophenyl)-4H-s-triazolo[4,3-a][1,4]benzodiazepine 8-nitro-1-[ethyl(2-propynyl)amino]methyl]-6-(2,6-difluorophenyl)-4H-s-triazolo[4,3-a][1,4]benzodiazepine. 8-nitro-1-[propyl(2-propynyl)amino)methyl]-6-(2,6-difluorophenyl)-4H-s-triazolo[4,3-a][1,4]benzodiazepine. 1-[[(2-propynyl)amino]methyl]-6-(o-chlorophenyl)-4H-s-triazolo[4,3-a][1,4]benzodiazepine. 1-[[methyl(2-propynyl)amino]methyl]-6-(o-chlorophenyl)-4H-s-triazolo[4,3-a][1,4]benzodiazepine, and the like.

The pharmacologically acceptable acid addition salts of compounds of formula II (as well as of formula IIA and IIB) can be prepared and isolated by conventional processes, such as reacting a compound of formula II with a selected pharmacologically acceptable acid. Such acids include hydrochloric, hydrobromic, phosphoric, sulfuric, acetic, tartaric, lactic, citric, malic, maleic, methanesulfonic, benzenesulfonic, cyclohexanesulfamic, toluenesulfonic acids, and the like. The reaction is conveniently performed in an organic solvent, e.g., ether, dioxane or tetrahydrofuran, ethanol, methanol, or ethyl acetate. The salts can be recovered by crystallization, precipitation or evaporating the solvent. These salts are usable in the same manner as the free bases, discussed hereinbefore.

I claim:

1. A compound of the formula II

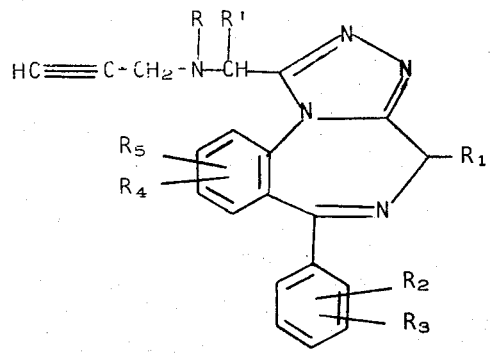

wherein R, R′ and $R_1$ are hydrogen or alkyl of 1 to 3 carbon atoms, inclusive; wherein $R_2$, $R_3$, $R_4$ and $R_5$ are hydrogen, alkyl as defined above, fluorine, chlorine, bromine, nitro or trifluoromethyl; and the pharmacologically acceptable acid addition salts thereof.

2. A compound according to claim 1 of the formula:

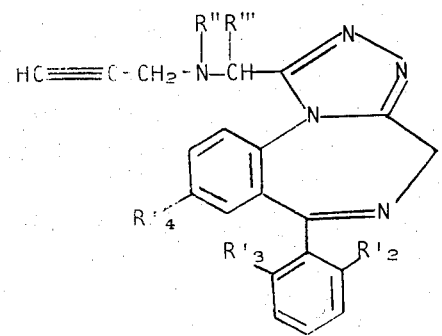

wherein R'' and R''' are hydrogen or methyl; wherein R'$_2$ is hydrogen, chlorine or fluorine; wherein R'$_3$ is hydrogen, or fluorine, providing R'$_2$ is fluorine, and wherein R'$_4$ is chlorine, fluorine, bromine, trifluoromethyl and nitro, and the pharmacologically acceptable addition salts thereof.

3. A compound according to claim 1 of the formula:

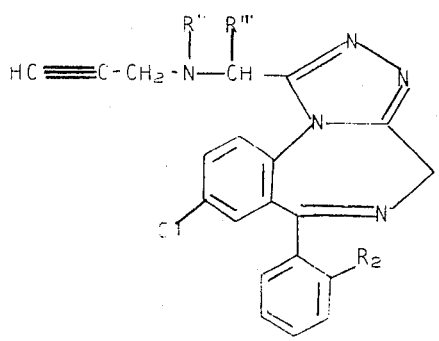

wherein R'' and R''' are hydrogen or methyl, and wherein R$_2$ is hydrogen, chlorine or fluorine and the pharmacological acceptable acid addition salts thereof.

4. A compound according to claim 3, wherein R'', R''' and R$_2$ are hydrogen and the compound is therefore 8-chloro-1-[[(2-propynyl)amino]methyl]-6-phenyl-4H-s-triazolo-[4,3-a][1,4]benzodiazepine.

5. A compound according to claim 3, wherein R'' and R''' are hydrogen, R$_2$ is chlorine, and the compound is therefore 8-chloro-1-[[(2-propynyl)amino]methyl]-6-(o-chlorophenyl)-4H-s-triazolo[4,3-a][1,4]benzodiazepine.

6. A compound according to claim 3, wherein R''' is methyl, R'' and R$_2$ are hydrogen and the compound is therefore 8-chloro-1-[1-[(2-propynyl)amino]ethyl]-6-phenyl-4H-s-triazolo[4,3-a][1,4]benzodiazepine.

7. A compound according to claim 3 wherein R'' is methyl, R$_2$ and R''' are hydrogen and the compound is therefore 8-chloro-1-[[methyl(2-propynyl)amino]methyl]-6-phenyl-4H-s-triazolo[4,3-a][1,4]benzodiazepine.

8. A compound according to claim 3, wherein R'' and R''' are methyl, R$_2$' is chloro, and the compound is therefore 8-chloro-1-[1-[methyl(2-propynyl)amino]ethyl]-6-(o-chlorophenyl)-4H-s-triazolo[4,3-a][1,4]benzodiazepine.

9. A compound according to claim 2, wherein R'', R''' and R'$_3$ are hydrogen, R'$_2$ is chlorine, R'$_4$ is nitro, and the compound is therefore 8-nitro-1-[[(2-propynyl)amino]-methyl]-6-(o-chlorophenyl)-4H-s-triazolo[4,3-a][1,4]benzodiazepine.

10. A compound according to claim 2, wherein R'' and R'$_3$ are hydrogen, R''' is methyl, R'$_2$ is chlorine, R'$_4$ is nitro, and the compound is therefore 8-nitro-1-[1-[(2-propynyl)amino]ethyl]-6-(o-chlorophenyl)-4H-s-triazolo-[4,3-a][1,4]benzodiazepine.

11. A compound according to claim 3, wherein R''' is hydrogen, R'' is methyl, and R'$_2$ is chlorine and the compound is therefore 8-chloro-1-[[methyl(2-propynyl)-amino]methyl]-6-(o-chlorophenyl)-4H-s-triazolo[4,3-a]-[1,4]benzodiazepine.

12. A compound according to claim 2, wherein R''' and R'$_2$ are hydrogen, R'' is methyl and R'$_4$ is nitro and the compound is therefore 8-nitro-1-[[methyl(2-propynyl)-amino]methyl]-6-phenyl-4H-s-triazolo[4,3-a][1,4]benzodiazepine.

13. A compound according to claim 2, wherein R''' and R'$_2$ are hydrogen, R'' is methyl and R'$_4$ is trifluoromethyl and the compound is therefore 8-trifluoromethyl-1-[[methyl(2-propynyl)amino]methyl]-6-phenyl-4H-s-triazolo[4,3-a][1,4]benzodiazepine.

14. A compound according to claim 2, wherein R''' and R'$_2$ are hydrogen, R'' is methyl and R'$_4$ is fluoro and the compound is therefore 8-fluoro-1-[[methyl(2-propynyl)amino]-methyl]-6-phenyl-4H-s-triazolo[4,3-a][1,4]benzodiazepine.

* * * * *